April 14, 1953     W. A. CLARK     2,634,800
SPRING CUSHION STRUCTURE FOR MOTOR VEHICLES
Filed May 31, 1951     3 Sheets-Sheet 1
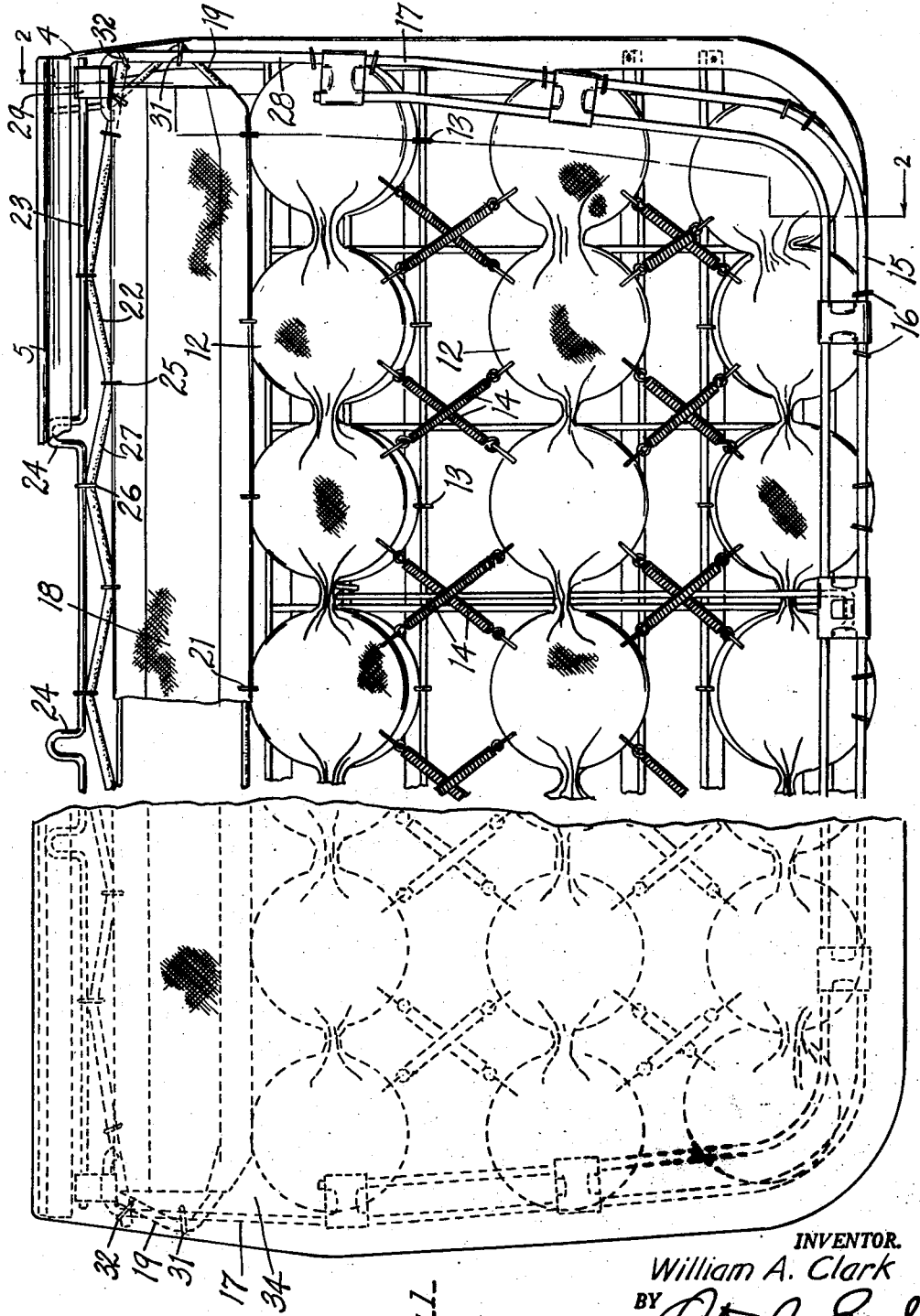
Fig. 1.
INVENTOR.
William A. Clark
BY 
ATTORNEY.

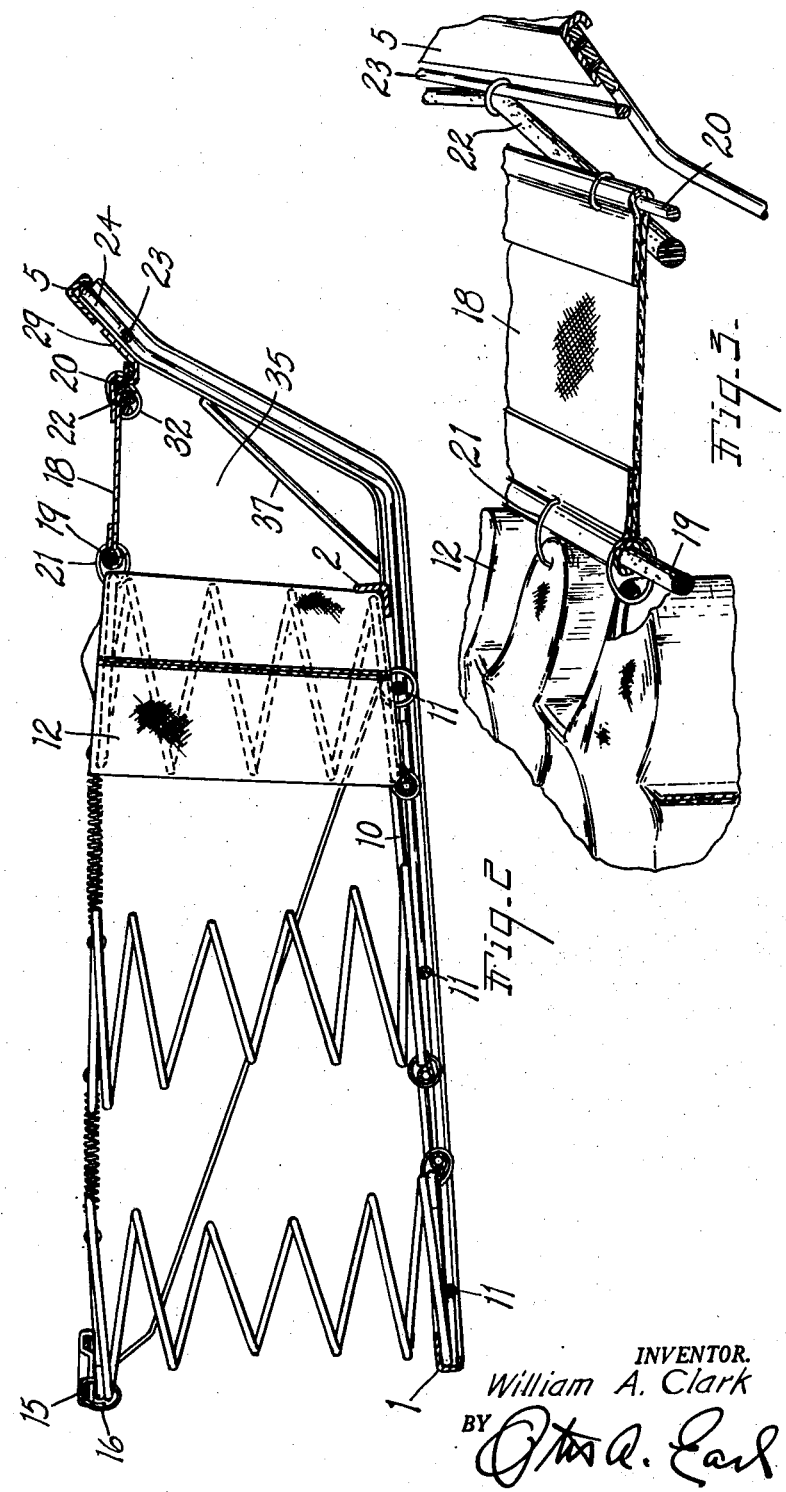

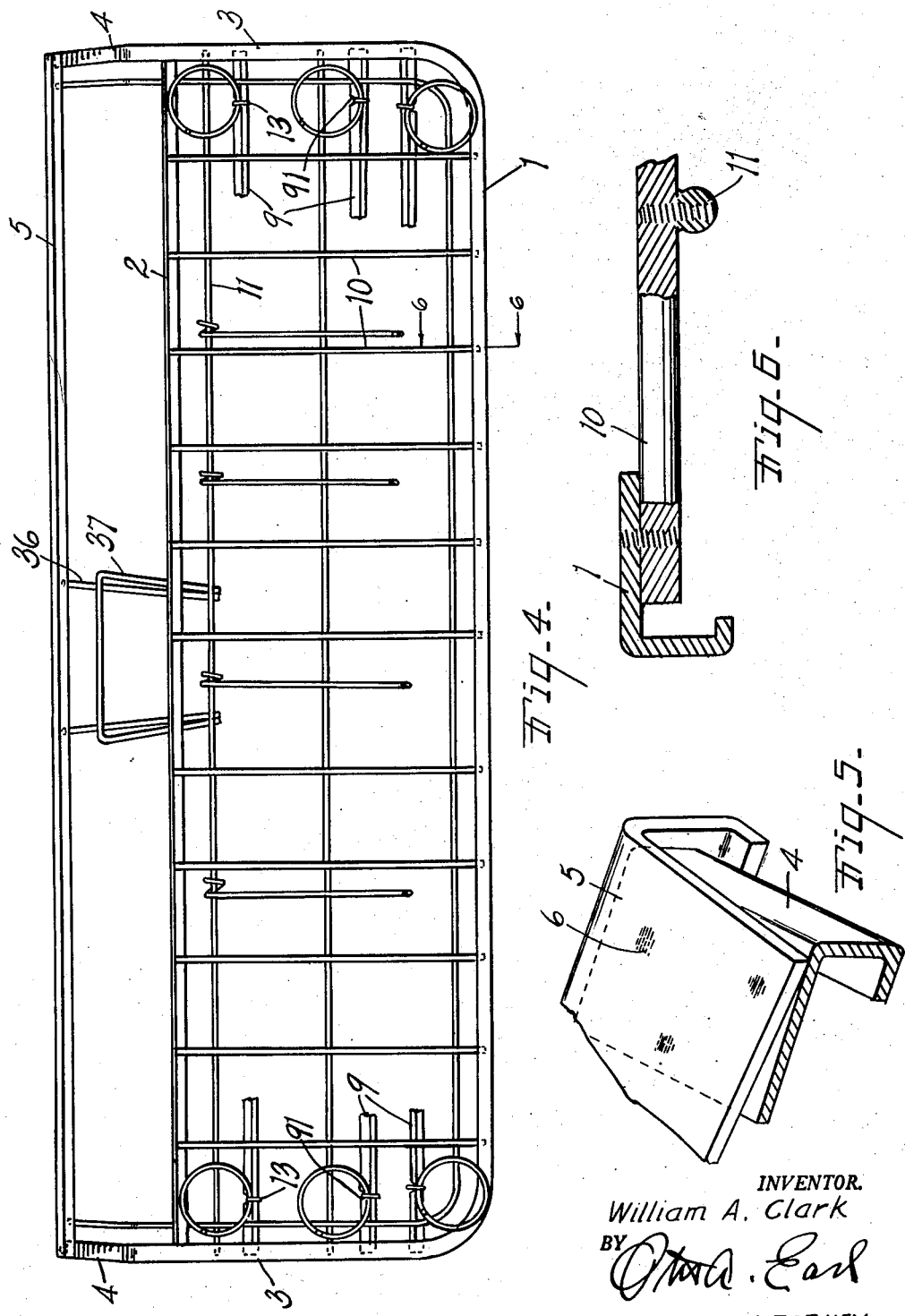

Patented Apr. 14, 1953

2,634,800

UNITED STATES PATENT OFFICE 2,634,800

SPRING CUSHION STRUCTURE FOR MOTOR VEHICLES

William A. Clark, Detroit, Mich.

Application May 31, 1951, Serial No. 229,166

10 Claims. (Cl. 155—181)

This invention relates to improvements in spring cushion structure for motor vehicles.

The main objects of this invention are:

First, to provide a spring cushion structure well adapted for use in the front seats of automobiles providing foot space for automobiles having close coupled front and rear seat arrangements and at the same time effectively supporting the upholstery.

Second, to provide a structure having these advantages which is quite economical, and is strong and durable in structure.

Objects relating to details and economies of the invention will appear from the description to follow. The invention is pointed out in the claims.

A preferred embodiment of the invention is illustrated in the accompanying drawing, in which:

Fig. 1 is a fragmentary plan view of a structure embodying the invention, the upholstery being broken away and certain parts below the portion of upholstery illustrated being indicated by dotted lines.

Fig. 2 is a fragmentary view in vertical section from front to rear on a line corresponding to line 2—2 of Fig. 1, however with only the rear body springs illustrated being of the pocketed type.

Fig. 3 is an enlarged fragmentary perspective view illustrating details of the upholstery supporting strip at the rear of the body spring assembly.

Fig. 4 is a fragmentary plan view, with certain parts omitted showing details of the base structure and arrangement of springs, fragments of the springs being shown conventionally and without pockets as in the embodiments illustrated in Fig. 1.

Fig. 5 is an enlarged fragmentary perspective view showing details of the mounting of the rear rail.

Fig. 6 is an enlarged fragmentary view on a line corresponding to line 6—6 of Fig. 4.

In the embodiment of my invention illustrated, the base frame comprises the front and rear members 1 and 2 and end members 3—3. The end members extend rearwardly of the rear base member 2 and have upturned arms 4 at their rear ends to which the rail 5 is secured. The rail 5 is desirably of angle section and receives the ends of the arms 4 which are welded thereto as indicated at 6. The base of the embodiment illustrated is provided with spring supporting bars 9 of angled section extending longitudinally and a grid work of wires 10 and 11.

In the embodiment of my invention shown in Fig. 1 rows of pocketed springs 12 are mounted upon the base, the bottom coils being secured to the bars 9 by means of clips or hog rings 13. The bars are notched at 91 to prevent slipping of the clips thereon. The tops of the springs are connected by helical tie members 14. The top border frame 15 is secured to the tops of the border springs by means of clips 16. This top border frame has end portions 17 which extend rearwardly of the rear row of body springs for a purpose which will be pointed out. It will be noted that there is a substantial space between the rear body springs and the rear rail which is supported in rearwardly spaced relation to the rear body springs and in an elevated position relative to the base.

The flexible filler or upholstery supporting strip 18 of the embodiment illustrated is of flexible material such as fabric and has an elastic cord or strand 19 preferably of rubber, secured to its front edge by folding the front edge of the strip 18 around the strand 19 and securing it in position as by stitching or adhesive, the securing means not being illustrated. The rear end of the strip 18 is folded around the wire reinforcing strand 20, the folded edge being secured by suitable means. The front edge of the strip is secured by means of clips or hog rings 21 to the top coils of the rear row of body springs with the clips embracing the resilient cord or strand 19. The rear edge of the strip 18 is springably connected to the rear rail. In the embodiment illustrated this consists of the resilient strand or cord 22, preferably of rubber, and the tie wire 23 which has rearwardly extending loops 24 secured to the rail. The elastic tie strand 22 is connected to the strip 18 by means of clips 25 which embrace the reinforcing wire 20 and to the tie wire 23 by similar clips 26, the clips 25 and 26 being alternated. The clips closely embrace the strand 22 to prevent substantial sliding movement thereof through the clips. This results in a plurality of resilient tie reaches 27 connecting the upholstery supporting strip 18 to the rail and supporting it for yielding movement under pressure applied at any point thereof. In effect, the strip 18 is an extension of the body spring assembly.

The border frame has arm portions 28 extending rearwardly from the body springs at the ends of the strip 18 and connected by clips 29 to the tie wire 23. In the embodiment illustrated the strands 19 and 22 are formed of one piece of rubber cord. The ends are connected by the clip 32, and the loops of the cord are connected by the clips 31 to the top border frame. This provides an effective connection for the upholstery supporting strip so that it yields with the body springs and at the same time effectively supports the upholstery indicated conventionally at 34 in Fig. 1 and provides foot space 35 at the rear of the body springs and below the portion of the upholstery supported by the strip 18. This results in a very effective spring assembly for front cushions having foot space below the rear part of the cushion.

The rail 5, in the embodiment illustrated, is further supported by the angled struts 36 which are secured to the base at their forward ends. The struts are braced by the brace members 37.

I have illustrated and described my invention in a practical commercial embodiment thereof. I have not attempted to illustrate or describe certain modifications or adaptations that might be desirable for particular body structures as it is believed that this disclosure will enable those skilled in the art to embody or adapt my invention as may be desired.

Having thus described my invention, what I claim as new and desire to secure by Letters Patent is:

1. In a spring structure the combination of a base comprising, front, rear and end members, the end members being extended beyond the rear base member and turned upwardly, a rear rail mounted on said upturned ends in rearwardly spaced elevated relation to the base, body springs mounted on said base, resilient ties connecting the tops of adjacent body springs, a flexible filler strip disposed between the body springs and the rear rail and provided with a resilient strand at its rear edge, the front edge of the filler strip being secured to the top coils of adjacent body springs by clips engaging the said resilient strand, a tie rod secured to said rear rail, an elastic tie strand, clips alternately securing the tie strand to said tie rod and to the wire strand of said filler strip, the clips being in clamped engagement with the tie strand and providing a plurality of relatively short reaches connecting the filler strip to the tie rod, and a top border frame comprising end members connected at their rear ends to said tie rod, the ends of the elastic strands being connected to each other and to said top border frame member.

2. In a spring structure the combination of a base comprising, front, rear and end members, the end members being extended beyond the rear base member and turned upwardly, a rear rail mounted on said upturned ends in rearwardly spaced and elevated relation to the base, body springs mounted on said base, a filler strip having a resilient strand at its front edge and a wire strand at its rear edge, the resilient strand at the front edge of the filler strip being connected to the top coils of adjacent body springs and the wire strand being resiliently connected to the rear rail.

3. In a spring structure the combination of a base, body springs mounted on said base, a rear rail carried by said base in rearwardly spaced relation to the body springs, a filler strip connected at its forward edge to the adjacent body springs, an elastic tie strand alternately connected to said rail and to said filler strip providing a plurality of reaches connecting the filler strip to the rail, and a top border frame comprising end members, the elastic strand secured to the front edges of the filler strip being extended beyond the ends thereof and secured to said top border frame end members, the ends of said elastic tie strand being connected to said top border frame end members.

4. In a spring structure the combination of a base, body springs mounted on said base, resilient ties connecting the tops of adjacent body springs, a rear rail carried by said base in rearwardly spaced relation to the body springs, a filler strip provided with a resilient strand at its front edge and a wire strand at its rear edge, the resilient strand being secured to the top coils of adjacent body springs and the wire strand being resiliently connected to said rear rail.

5. In a spring structure, the combination of a base, body springs carried thereby, a rear rail carried by the base and disposed in rearwardly spaced relation in the body springs, a flexible upholstery supporting strip disposed between the body springs and rail and connected to adjacent body springs, an elastic tie strand alternately connected at spaced points to said rail and to said strip to yieldingly support the strip and provide foot space at the rear of the body springs and below said rail, and a top border frame for the spring assembly including end members connected at their rear ends to said rail.

6. In a spring structure, the combination of a base, body springs carried thereby, a rear rail carried by the base and disposed in rearwardly spaced relation in the body springs and in approximately the plane of the tops thereof, and an upholstery supporting strip disposed between the body springs and rail, the front edge of the strip being connected to adjacent body springs, its rear edge being springably connected to said rail to yieldingly support the strip and provide foot space at the rear of the body springs and below said rail.

7. A spring structure comprising a supporting frame, and body springs carried thereby, said frame including a rear rail disposed in rearwardly spaced relation relative to the tops of the body springs, an upholstery supporting strip disposed between the body springs and rail, the forward edge of the said strip being connected to adjacent body springs, and an elastic tie strand alternately connected at spaced points to said rail and to said strip to yieldingly support the strip and provide foot space at the rear of the body springs and below said rail.

8. A spring structure comprising a frame, and an assembly of body springs carried thereby, said frame including a rear rail disposed in rearwardly spaced relation to the tops of the body spring assembly, and an upholstery supporting strip connected at its front edge to the body spring assembly and resiliently connected at its rear edge to said rail to coact with the body spring assembly in yieldingly supporting upholstery disposed thereon and to provide foot space below the rear portion of the upholstery.

9. A spring structure comprising a frame and main body springs carried thereby, said frame including a rear rail disposed in rearwardly spaced relation to the body springs and in substantially the plane of the tops thereof, and an upholstery supporting strip connected at its front edge to adjacent body springs and springably connected at its rear edge to said rail to coact with the body springs in yieldingly supporting upholstery disposed thereon and providing foot-space below the rear portion of the upholstery at the rear of the body springs.

10. A spring structure comprising a frame and main body springs carried thereby, said frame including a rear rail disposed in rearwardly spaced relation to the body springs, and an upholstery supporting strip connected at its front edge to adjacent body springs and springably connected at its rear edge to said rail to coact with the body springs in yieldingly supporting upholstery disposed thereon and providing foot space below the rear portion of the upholstery at the rear of the body springs.

WILLIAM A. CLARK.

No references cited.